United States Patent
Folchi et al.

(10) Patent No.: US 9,578,239 B2
(45) Date of Patent: Feb. 21, 2017

(54) CONTROLLING METHOD FOR ELECTRONIC APPARATUS WITH ONE SWITCH BUTTON

(71) Applicant: HTC Corporation, Taoyuan (TW)

(72) Inventors: David Folchi, Seattle, WA (US); Nicole Pauline Sangco, Seattle, WA (US); Ting-Chia Kuo, Taoyuan (TW); Hui-Ping Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 54 days.

(21) Appl. No.: 14/598,241

(22) Filed: Jan. 16, 2015

(65) Prior Publication Data
US 2015/0207994 A1 Jul. 23, 2015

Related U.S. Application Data

(60) Provisional application No. 61/928,422, filed on Jan. 17, 2014.

(51) Int. Cl.
*H04N 5/225* (2006.01)
*H04N 5/222* (2006.01)
*H04N 5/232* (2006.01)

(52) U.S. Cl.
CPC ................................. *H04N 5/23245* (2013.01)

(58) Field of Classification Search
CPC ............ H04N 5/23293; H04N 5/23216; H04N 1/2145; H04N 5/23219; H04N 1/0044; H04N 21/42224; H04N 2201/0096; G06F 3/0488; G06F 3/04886; G06F 3/0416; G11B 27/005; H04M 2250/22

USPC .................... 348/211.8, 333.01, 333.05, 376
See application file for complete search history.

(56) References Cited

U.S. PATENT DOCUMENTS

| | | | |
|---|---|---|---|
| 2004/0174434 A1* | 9/2004 | Walker | G06F 17/30265 348/211.3 |
| 2012/0019704 A1 | 1/2012 | Levey | |
| 2012/0242599 A1* | 9/2012 | Seo | G06F 1/1641 345/173 |
| 2013/0286250 A1* | 10/2013 | Kumar | H04N 5/232 348/231.99 |
| 2014/0055633 A1* | 2/2014 | Marlin | H04N 5/23206 348/220.1 |

(Continued)

OTHER PUBLICATIONS

Corresponding European Search Report and the first Official Communication.

*Primary Examiner* — Trung Diep
(74) *Attorney, Agent, or Firm* — CKC & Partners Co., Ltd.

(57) ABSTRACT

A controlling method suitable for an electronic apparatus is disclosed. The electronic apparatus includes a camera module and a switch button. The controlling method includes following steps. A holding duration is measured started from a first time point when the switch button is pressed down. In response to the holding duration ends within a first threshold period, a singular image is generated. In response to the holding duration exceeds the first threshold period and ends within a second threshold period from the first time point, a series of burst images during the holding duration is generated. In response to the holding duration exceeds the second threshold period, a series of burst images during the second threshold period is generated, and also a video is generated.

18 Claims, 10 Drawing Sheets

(56) References Cited

U.S. PATENT DOCUMENTS

2014/0056633 A1\* 2/2014 Tsuchiya ................ B41J 11/70
400/621

\* cited by examiner

CONTROLLING METHOD FOR ELECTRONIC APPARATUS WITH ONE SWITCH BUTTON

RELATED APPLICATIONS

This application claims the priority benefit of U.S. Provisional Application Ser. No. 61/928,422, filed Jan. 17, 2014, which is herein incorporated by reference.

BACKGROUND

Field of Invention

The present application relates to a controlling method for an electronic apparatus with one switch button. More particularly, the present application relates to how to activate different functions on the electronic apparatus with one switch button.

Description of Related Art

Recently, people get used to record their daily life by taking a photograph, taking a series of burst photographs or recording videos, and they can review the photographs and videos in a digital album on their devices. The photograph shows a specific moment. The series of burst photographs can be arranged into a timeline of photographs or processed into an animation for showing a movement of people, objects or scenes. The videos record the whole scenes during a specific period of time. Users may utilize different types of media (e.g., a singular image, a series of images or a video) under different circumstances.

In general, a camera device (or a photograph application running on an electronic apparatus with the camera module) has at least one mode-selecting key (for selecting between a singular photo capturing mode, a burst photo capturing mode and a video recording mode) and a shutter key for activating the corresponding function for shooting images or recording videos. In some other cases, the camera device (or the photograph application) may have individual shutter keys for photo capturing and video recording. User must be familiar about the different keys for performing different functions.

Aforesaid mode-selecting key or individual shutter keys occupy extra space on the camera device. In addition, the user is required to switch the electronic apparatus into a proper mode (e.g., between a singular photo capturing mode, a burst photo capturing mode and a video recording mode) to perform the function of interest.

SUMMARY

An aspect of the present disclosure is to provide a controlling method suitable for an electronic apparatus, which includes a camera module and a switch button. The controlling method includes following steps. A signal is sensed from the switch button indicating that the switch button is pressed down or released. A holding duration is measured started from a first time point when the switch button is pressed down. The holding duration is determined relative to a first threshold period and a second threshold period, and a singular shooting mode, a burst shooting mode and a video recording mode of the camera module are selectively triggered according to the holding duration.

In response to the holding duration ends within a first threshold period from the first time point, a singular image captured by the camera module at the first time point is generated. In response to the holding duration exceeds the first threshold period and ends within a second threshold period from the first time point, a series of burst images captured by the camera module during the holding duration is generated. In response to the holding duration exceeds the second threshold period, a series of burst images captured by the camera module during the second threshold period is generated, and a video recorded by the camera module started from a second time point corresponding to the second threshold period is generated. The second time point is later than the first time point.

Another aspect of the present disclosure is to provide an electronic apparatus includes a camera module, a switch button and a controller module. The switch button is configured for generating a signal corresponding to the switch button is pressed down or released. The controller module is coupled with the camera module and the switch button. The controller module is configured for sensing the signal from the switch button, and measuring a holding duration started from a first time point when the switch button is pressed down. The holding duration is determined relative to a first threshold period and a second threshold period, and a singular shooting mode, a burst shooting mode and a video recording mode of the camera module are selectively triggered according to the holding duration.

In response to the holding duration ends within a first threshold period from the first time point, the controller module is configured to generate a singular image captured by the camera module at the first time point. In response to the holding duration exceeds the first threshold period and ends within a second threshold period from the first time point, the controller module is configured to generate a series of burst images captured by the camera module during the holding duration. In response to the holding duration exceeds the second threshold period, the controller module is configured to generate a series of burst images captured by the camera module during the second threshold period, and the controller module is configured to generate a video recorded by the camera module started from a second time point corresponding to the second threshold period. The second time point is later than the first time point.

BRIEF DESCRIPTION OF THE DRAWINGS

The disclosure can be more fully understood by reading the following detailed description of the embodiments, with reference made to the accompanying drawings as follows.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
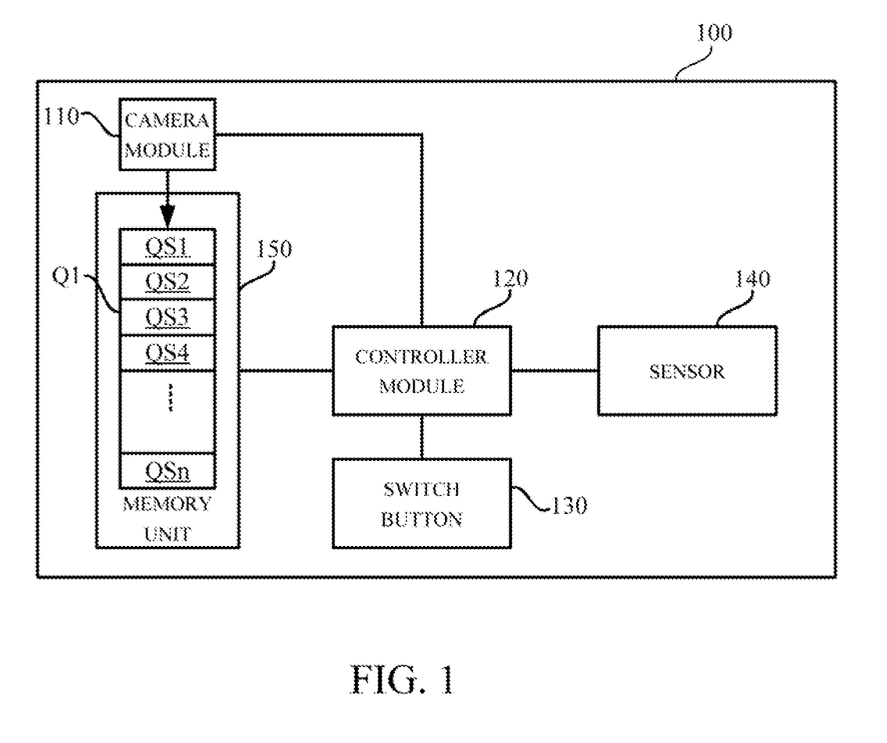
FIG. 1 is a block diagram illustrating an electronic apparatus according to an embodiment of the disclosure.

Reference is made to FIG. 1. FIG. 1 is a block diagram illustrating an electronic apparatus 100 according to an embodiment of the disclosure. As shown in FIG. 1, the electronic apparatus 100 in the embodiment includes a camera module 110, a controller module 120 and a switch button 130.

In the embodiment, the camera module 110 is capable to perform different camera-related functions including capturing an image (take a singular photo at a time), capturing a series of burst images (take multiple images in sequential order within a specific period of time, e.g., five images in a second, ten images in a minute, etc) and recording a video.

In a traditional configuration, the electronic apparatus may include different function keys (e.g., at least two shutter keys) for aforesaid different functions, or include a mode-selecting key for switching between different functions before capturing the images or recording the video (e.g., at least one shutter key and one mode-selecting key).

In this embodiment, the switch button 130 is configured for generating a signal corresponding to the switch button is pressed down or released, and the switch button 130 sends the signal to the controller module 120. The switch button 130 is utilized as an integrated key for triggering the camera module 110 to perform all different functions. Different functions are activated by manipulating the switch button 130 with different gestures (e.g., click, short press, long press, etc). In some embodiments, the switch button 130 can be a physical button disposed on a surface of the electronic apparatus 100. The switch button 130 generates the corresponding signal in response to the switch button 130 is pressed down (e.g., set at a high voltage level) or released (e.g., set at a low voltage level). However, the switch button 130 of the disclosure is not limited to the physical button.

In other embodiment, the switch button 130 can be a virtual button displayed on an interface application of the touch screen (not shown in FIG. 1) of the electronic apparatus 100. In this case, the interface application including the switch button 130 sends the signal (corresponding to the switch button is pressed down or released) to the controller module 120.

The controller module 120 is coupled with the camera module 110 and the switch button 130. The controller module 120 is configured for sensing the signal from the switch button 130 and measuring a holding duration while the switch button 130 is pressed down. The controller module 120 control the camera module 110 to perform different functions and generates different output file (e.g., a singular image, multiple images and/or a video) according to the holding duration of the switch button 130. The details about how to achieve the integration manipulation for triggering different functions by the switch button 130 are disclosed in following paragraphs.

Figure 2A:
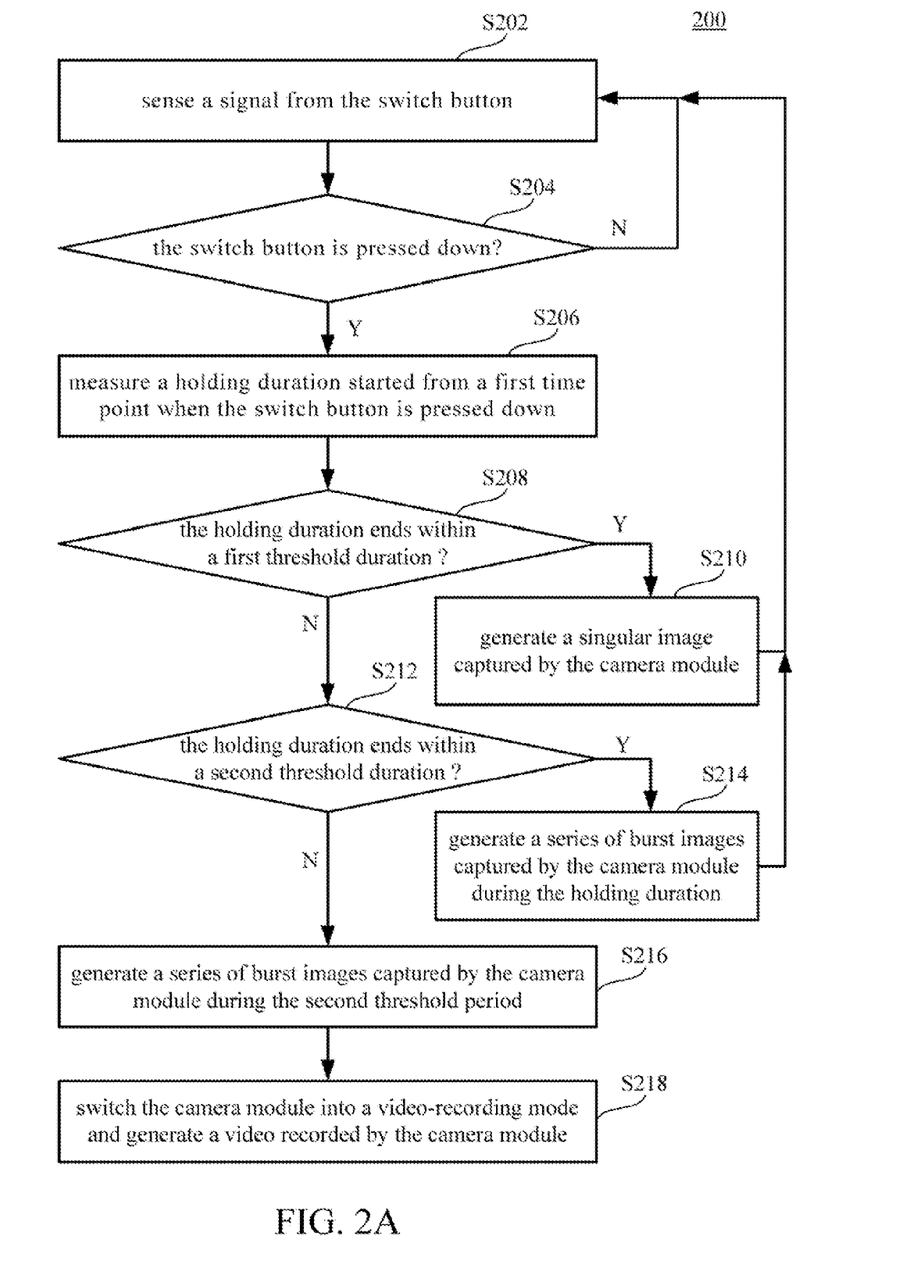
FIG. 2A is a flow chart diagram illustrating a controlling method according to an embodiment of the disclosure.
Figure 2B:
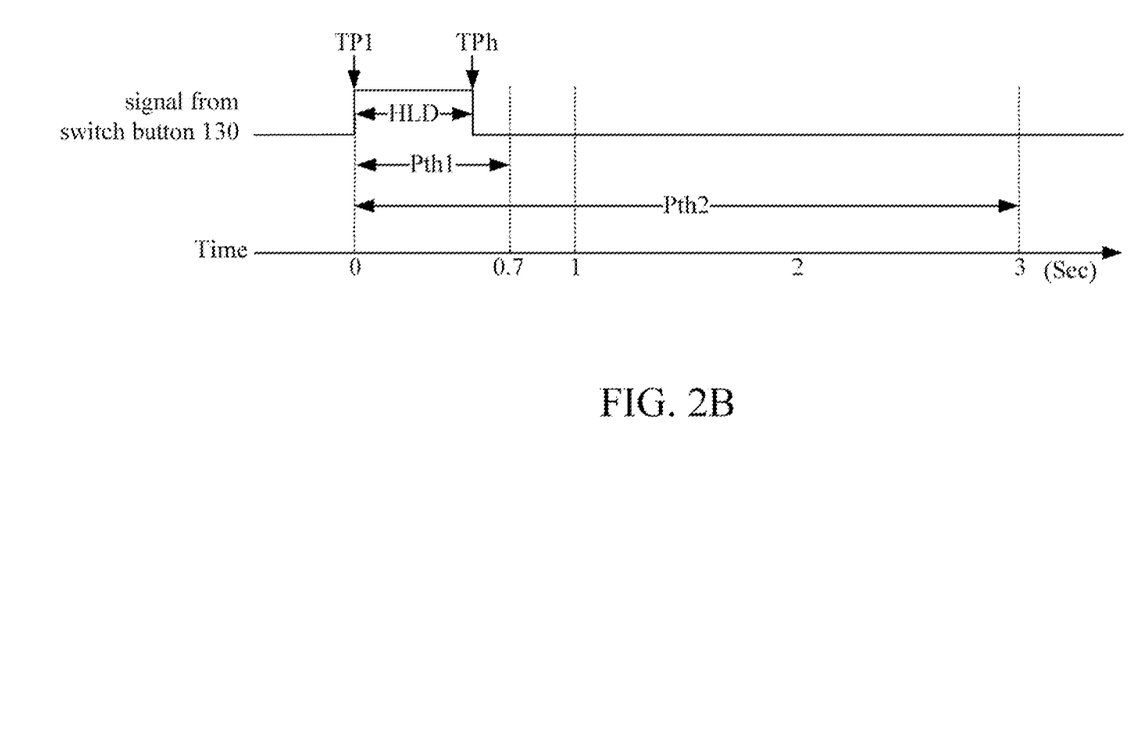
FIG. 2B is a timeline diagram illustrating the signal from the switch button according to a demonstrational example.

Reference is made to FIG. 2A and FIG. 2B. FIG. 2A is a flow chart diagram illustrating a controlling method 200 according to an embodiment of the disclosure. FIG. 2B is a timeline diagram illustrating the signal from the switch button 130 according to a demonstrational example.

The electronic apparatus 100 shown in FIG. 1 further includes a non-transitory computer-readable medium includes one or more sequences of instructions to be executed by the controller module 120 for performing the controlling method 200 explained in the followings.

As shown in FIG. 2A, step S202 is executed for sensing a signal from the switch button 130 by the controller module 120, and the signal from the switch button 130 indicates that the switch button 130 is pressed down or released.

Step S204 is executed for determining whether the switch button 130 is pressed down or not. If the switch button 130 is pressed down, step S206 is executed for measuring a holding duration HLD started from a first time point TP1, which is the moment that the switch button is pressed down at first. While the user holding the switch button 130, the holding duration HLD is kept on counting from the first time point TP1 until the switch button 130 is released (as the example shown in FIG. 2B, the switch button 130 is released at a time point TPh).

Afterward, the controlling method 200 is configured to determine the holding duration relative to a first threshold period and a second threshold period, and selectively trigger a singular shooting mode, a burst shooting mode and a video recording mode of the camera module according to the holding duration.

Step S208 is executed for determining whether the holding duration ends within a first threshold period Pth1 or not. In this embodiment, the first threshold period Pth1 indicates a threshold time between a click gesture and a short press gesture on the switch button 130. In this example shown in FIG. 2B, the first threshold period Pth1 is set at 0.7 second. However, the first threshold period Pth1 can be adjusted to another value according to practically situation and not limited to 0.7 second.

In response to the holding duration HLD ends within the first threshold period Pth1 from the first time point TP1 (as shown in FIG. 2B), step S210 is executed for generating a singular image captured by the camera module 110 at the first time point TP1 (i.e., the moment that the switch button 130 is just pressed down). In this case, a singular shooting mode of the camera module 110 is triggered.

If the holding duration exceeds the first threshold period Pth (not shown in FIG. 2B), step S212 is executed for further determining whether the holding duration ends within a second threshold period Pth2 or not. In this embodiment, the second threshold period Pth2 is longer than the first threshold period Pth1, and the second threshold period Pth2 indicates a threshold time between the short press gesture and a long press gesture on the switch button 130. In this example shown in FIG. 2B, the second threshold period Pth2 is set at three seconds. However, the second threshold period Pth2 can be adjusted to another value according to practically situation and not limited to three seconds.

In response to the holding duration (not shown in FIG. 2B) exceeds the first threshold period Pth1 and ends within the second threshold period Pth2 from the first time point TP1, step S214 is executed for generating a series of burst images captured by the camera module 110 during the holding duration in this case. In this case, a burst shooting mode of the camera module 110 is triggered.

If the holding duration further exceeds the second threshold period Pth2 (not shown in FIG. 2B), step S216 is executed for generating a series of burst images captured by the camera module 110 during the second threshold period Pth2 in this case, and step S218 is executed for switching the camera module 110 into a video recording mode and generate a video recorded by the camera module 110 started from a second time point TP2, which is later than the first time point TP1. In the embodiment, the second time point TP2 is the end point of the second threshold period Pth2. In this case, the burst shooting mode of the camera module 110 is triggered for generating the series of burst images during the second threshold period Pth2, and the video recording mode is triggered for generating the video started from the second time point TP2.

Based on aforesaid embodiment, the controller module 120 control the camera module 110 to perform different functions and generates different output file (e.g., a singular image, burst images and/or a video) according to the holding duration HLD of the switch button 130.

Figure 3:
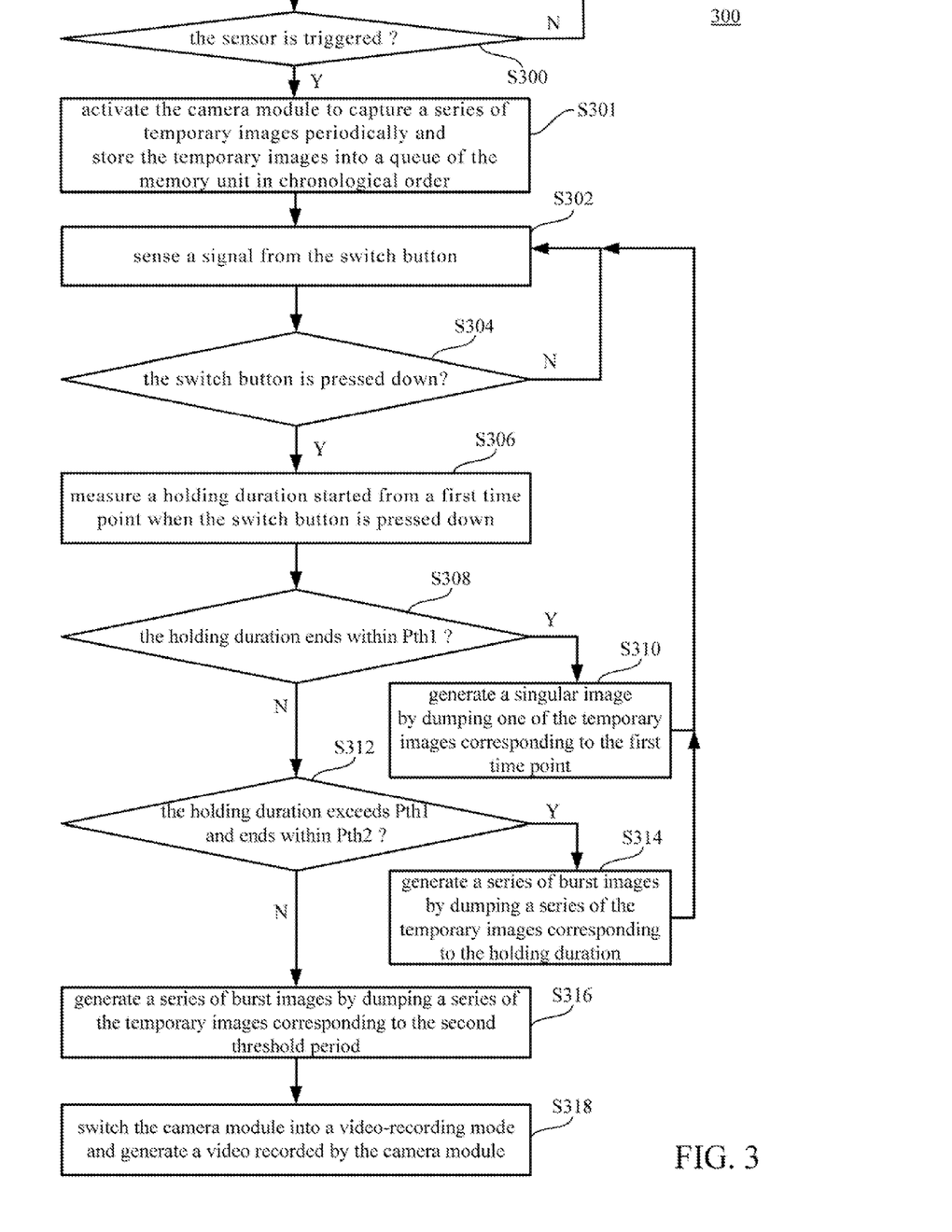
FIG. 3 is a flow chart diagram illustrating a controlling method according to an embodiment of the disclosure.
Figure 4:
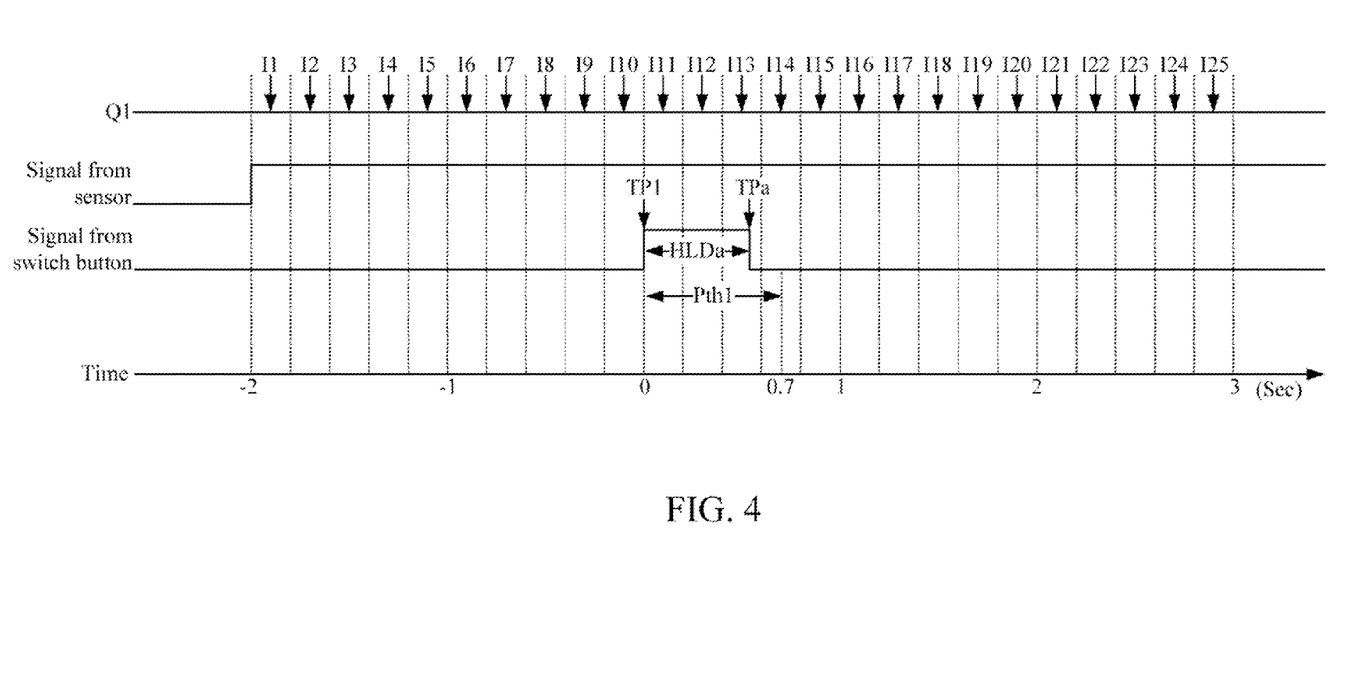
FIG. 4, FIG. 5 and FIG. 6 are timeline diagrams illustrating the signal from the switch button with different holding durations according to another demonstrational example.
Figure 5:
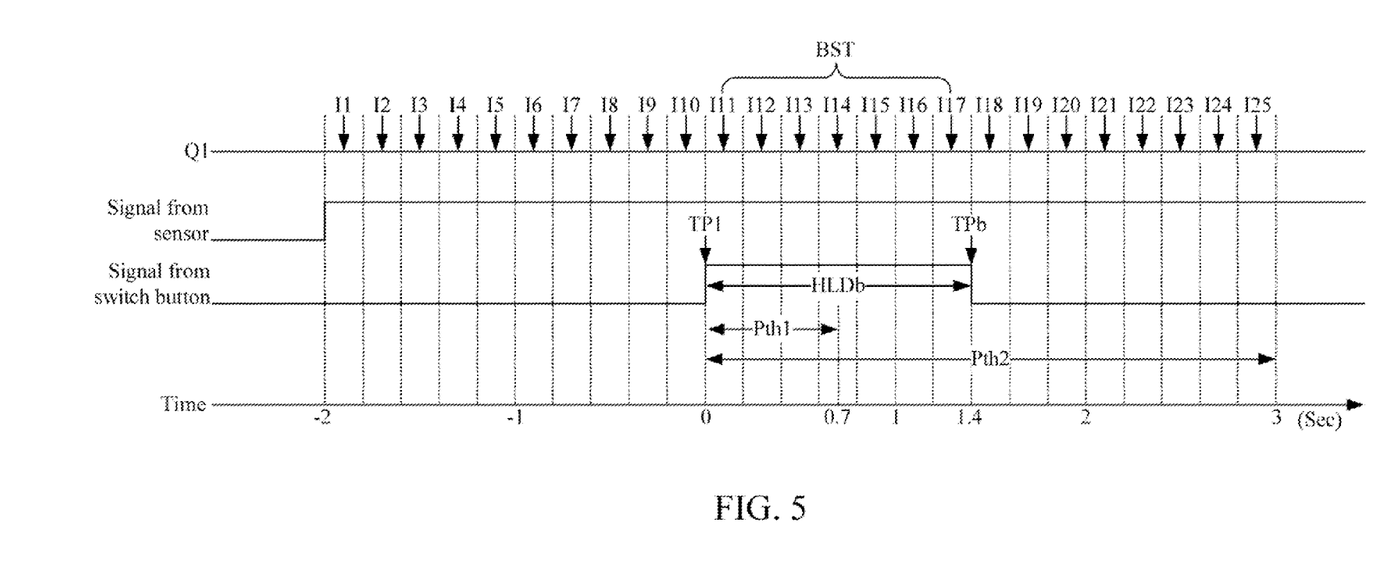
Figure 6:
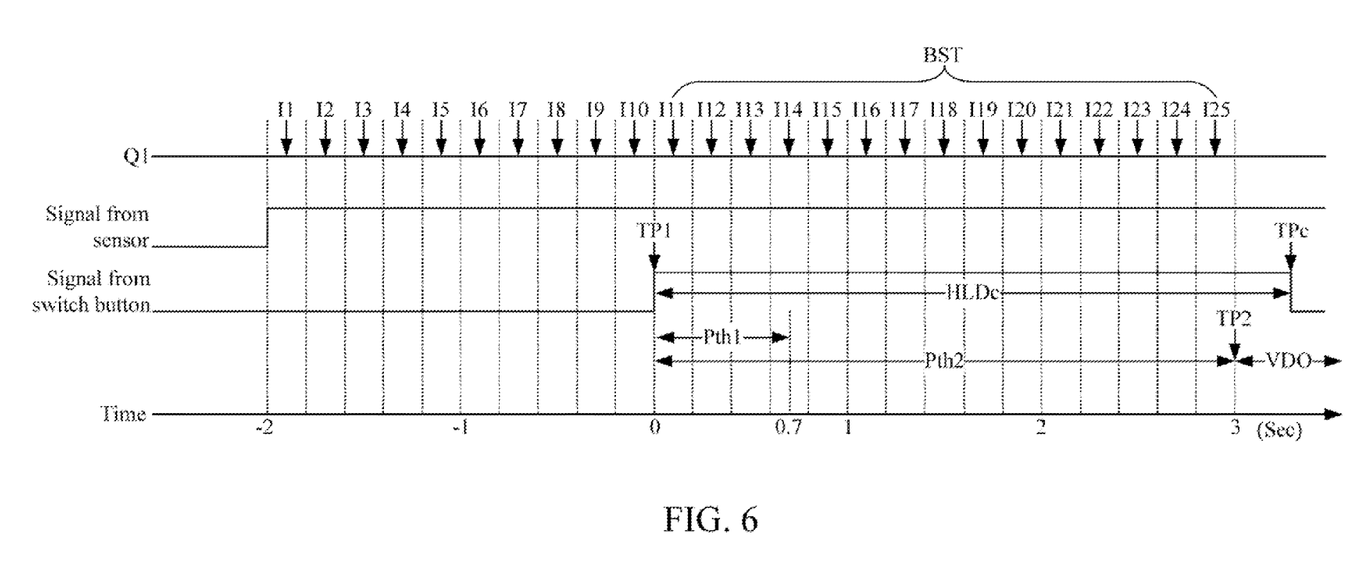

Reference is also made to FIG. 3 to FIG. 6. FIG. 3 is a flow chart diagram illustrating a controlling method 300 according to an embodiment of the disclosure. FIG. 4, FIG. 5 and FIG. 6 are timeline diagrams illustrating the signal from the switch button 130 with different holding durations according to another demonstrational example.

On traditional cameras, after the user press a triggering key (e.g., a shutter button or a shooting function key on a touch screen), an image sensor within the traditional camera is activated to capture an image. A shutter reaction time includes setting up the image sensor, collecting data by the image sensor and dumping the data as a newly captured image. It may take about 1~3 seconds to take one shot. Shooting a series of burst images in a short period (e.g., the burst shooting mode) is impossible to the traditional cameras.

In some embodiments, the electronic apparatus 100 as shown in FIG. 1 further includes a sensor 140 and a memory unit 150. The sensor 140 can be a grip sensor or a pressure sensor for sensing if there is a user grasping the electronic apparatus 100. When the electronic apparatus 100 is grasped by a user, the sensor 140 is triggered.

As shown in FIG. 3, step S300 is executed for determining whether the sensor 140 is triggered or not. In response to the sensor 140 is triggered (the electronic apparatus 100 is grasped by the user), step S301 is executed for activating the camera module 100 to capture a series of temporary images periodically, and storing the temporary images into a queue Q1 of the memory unit 150 in chronological order. For example, the camera 110 generates five temporary images every one second (e.g., 5 fps), but the disclosure is not limited to this. The temporary images are sequentially stored into queue slots QS1, QS2, QS3, QS4 . . . QSn of the queue Q1. When the queue Q1 is full, the latest temporary image is written into a queue slot with the oldest temporary image, such that the oldest temporary image is replaced by the latest temporary image.

In the example shown in FIG. 4 to FIG. 6, the moment that the user presses the switch button 130 is labeled as a relative origin of timeline, i.e., the "0" second shown in FIG. 4-FIG. 6.

It is assumed that two seconds before the switch button 130 is pressed down, the sensor 140 is triggered. The camera module 100 is activated to capture a series of temporary images periodically (the temporary images I1, I2, I3 . . . I25 are captured and gapped by every ⅕ second), and the temporary images are stored into the queue Q1.

As shown in FIG. 3, step S302 is executed for sensing a signal from the switch button 130 by the controller module 120, and the signal from the switch button 130 indicates that the switch button 130 is pressed down or released. Step S304 is executed for determining whether the switch button 130 is pressed down or not.

As shown in FIG. 3 and FIG. 4~FIG. 6, if the switch button 130 is pressed down, step S306 is executed for measuring a holding duration HLDa~HLDc started from a first time point TP1, which is the moment that the switch button is pressed down at first. While the user holding the switch button 130, the holding duration HLDa~HLDc is kept on counting from the first time point TP1 until the switch button 130 is released at time points TPa~TPc (FIG. 4~FIG. 6 shows different cases about when the switch button 130 is released at different time points TPa~TPc).

Step S308 is executed for determining whether the holding duration ends within a first threshold period Pth1 or not. In this embodiment, the first threshold period Pth1 indicates a threshold time between a click gesture and a short press gesture on the switch button 130. In this example, the first threshold period Pth1 is set at 0.7 second.

As shown in FIG. 3 and FIG. 4, in response to the holding duration HLDa ends within the first threshold period Pth1 from the first time point TP1, step S310 is executed for generating a singular image captured by the camera module 110 at the first time point TP1 (i.e., the moment that the switch button 130 is just pressed down). As shown in FIG. 4, the singular image is generated by dumping the temporary image I11 corresponding to the first time point TP1.

If the holding duration exceeds the first threshold period Pth1 (referring to FIG. 5 and FIG. 6), step S312 is executed for further determining whether the holding duration ends within a second threshold period Pth2 or not. In this embodiment, the second threshold period Pth2 is longer than the first threshold period Pth1, and the second threshold period Pth2 indicates a threshold time between the short press gesture and a long press gesture on the switch button 130. In this example shown in FIG. 4~FIG. 6, the second threshold period Pth2 is set at three seconds. However, the second threshold period Pth2 can be adjusted to another value according to practically situation and not limited to three seconds.

As shown in FIG. 5, in response to the holding duration HLDb exceeds the first threshold period Pth1 and ends within the second threshold period Pth2 from the first time point TP1, step S314 is executed for generating a series of burst images BST captured by the camera module 110 during the holding duration HLDb in this case. In the embodiment, the series of burst images BST are generated by dumping a series of the temporary images I11, I12, I13 . . . I17 corresponding to the holding duration HLDb (between TP1 and TPb).

As shown in FIG. 6, if the holding duration HLDc further exceeds the second threshold period Pth2, step S316 is executed for generating a series of burst images BST captured by the camera module 110 during the second threshold period Pth2 in this case. In the embodiment, the series of burst images BST are generated by dumping a series of the temporary images I11, I12, I13 . . . I25 corresponding to the second threshold period Pth2 (between TP1 and TP2). Furthermore, step S318 is executed for switching the camera module 110 into a video-recording mode and generate a video VDO recorded by the camera module 110 started from a second time point TP2, which is later than the first time point TP1. In the embodiment, the second time point TP2 is the end point of the second threshold period Pth2.

In an embodiment, the video VDO is started from the second time point TP2 and ended by the time that the switch button 130 is released. In another embodiment, the video VDO is started from the second time point TP2 and ended by the time that the switch button 130 is pressed again.

Based on aforesaid embodiment, the electronic apparatus 100 is able to capture the temporary images by the camera module 110 periodically and store them into the queue Q1. The controller module 120 control the camera module 110 to perform different functions and generates different output file (e.g., a singular image, burst images and/or a video) according to the different holding durations HLDa~HLDc of the switch button 130. The burst images can be generated by dumping the existed temporary images stored in the queue Q1. Therefore, the burst images BST can be generated easily without being limited by the shutter reaction time of the camera module 110.

In aforesaid embodiment, the burst images BST (as shown in FIG. 5 and FIG. 6) includes the images after the switch button 130 is pressed. However, in practical applications, when an object-of-interest shows up, the user require a little time to react and realize that it is the moment to press down the switch button 130. Therefore, some temporary images right before the moment that the switch button 130 is pressed down (i.e., the first time point TP1) are sometimes valuable. It will be better if the temporary images right before the first time point TP1 can be kept.

Figure 7:
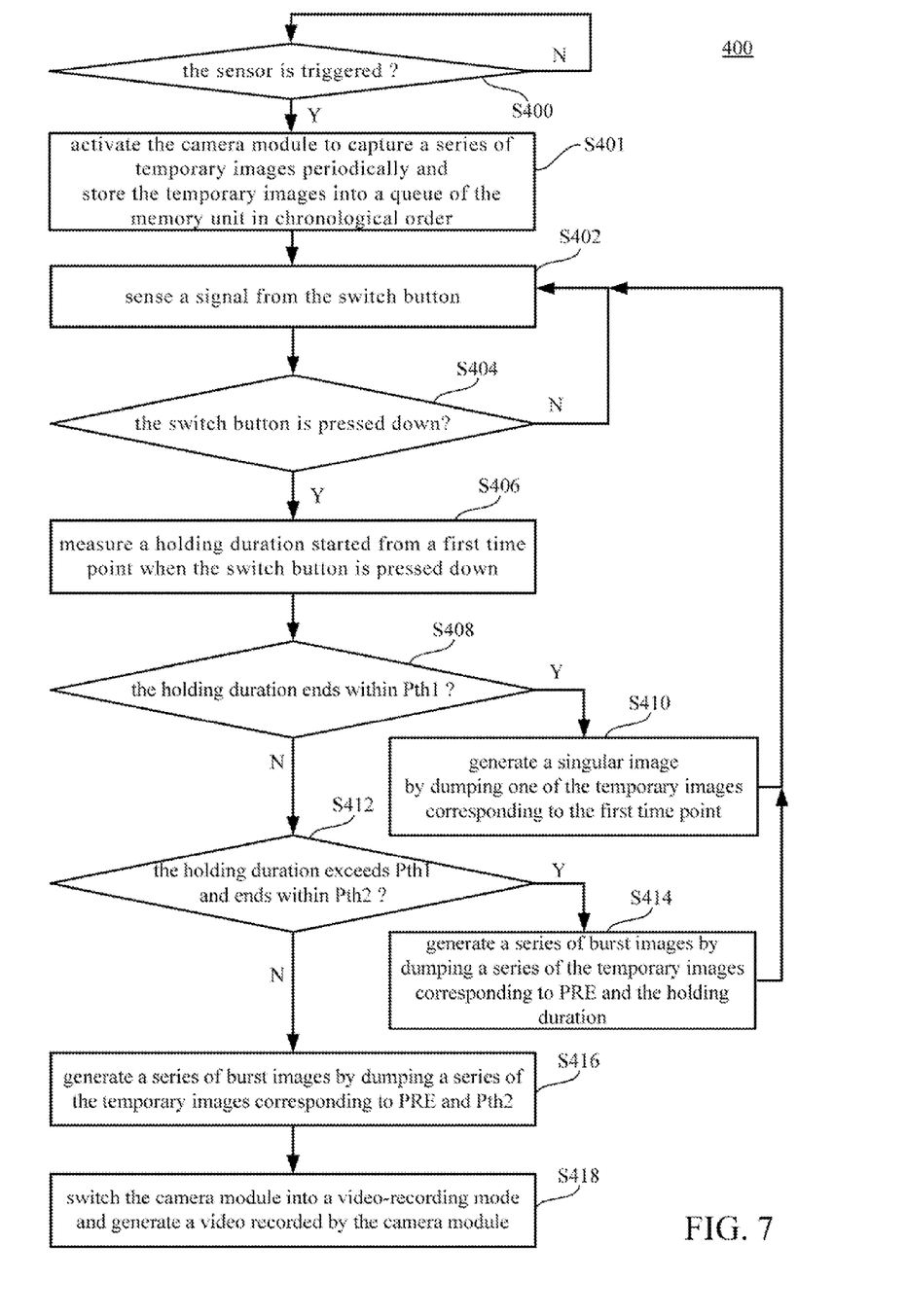
FIG. 7 is a flow chart diagram illustrating a controlling method according to an embodiment of the disclosure.
Figure 8:
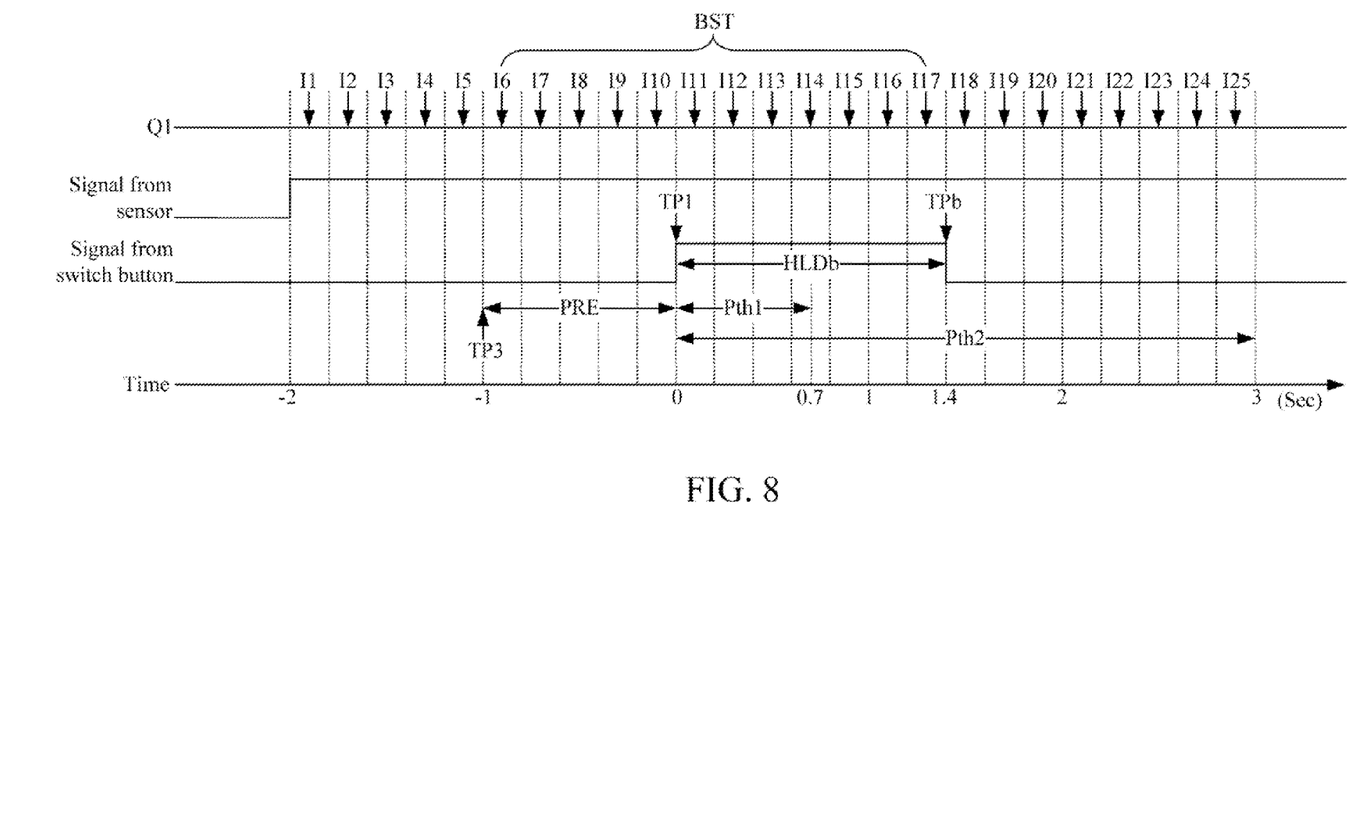
FIG. 8 and FIG. 9 are timeline diagrams illustrating the signal from the switch button with different holding durations according to another demonstrational example.
Figure 9:
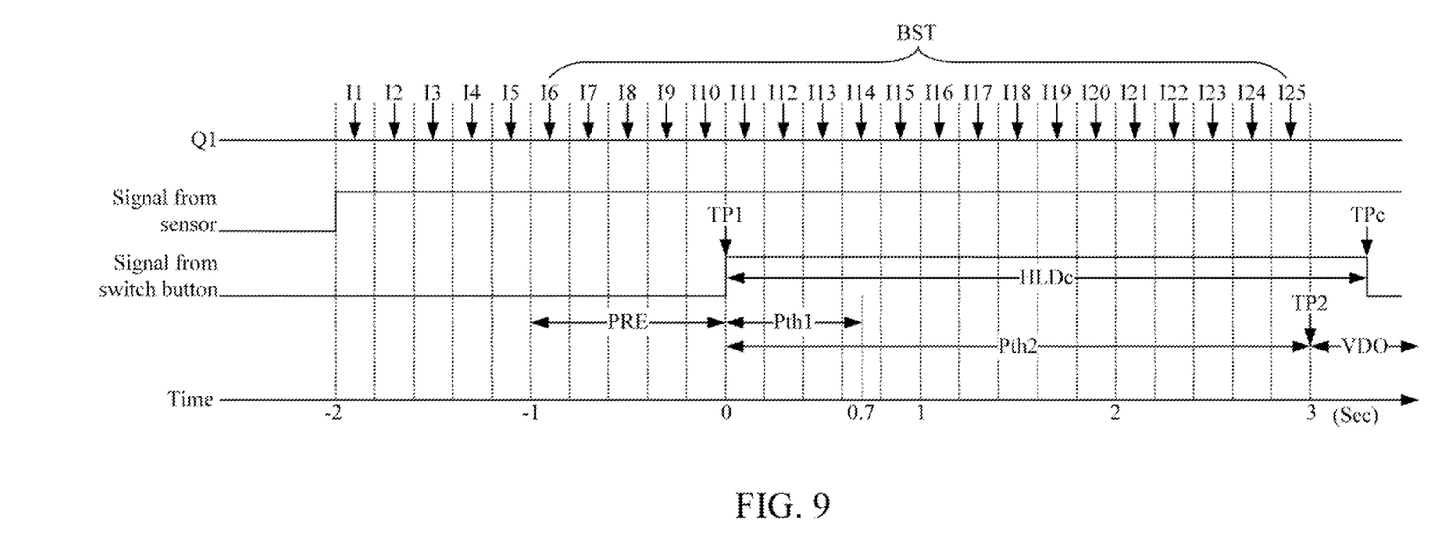

Reference is also made to FIG. 7, FIG. 8 and FIG. 9. FIG. 7 is a flow chart diagram illustrating a controlling method 400 according to an embodiment of the disclosure. FIG. 8 and FIG. 9 are timeline diagrams illustrating the signal from the switch button 130 with different holding durations according to another demonstrational example.

Most of steps S400 to S418 of the controlling method 400 shown in FIG. 7 are similar to the Steps S300 to S318 of the controlling method 300 shown in FIG. 3. The details of these steps can be referred to aforesaid paragraphs, and not to be repeated herein. The controlling method 400 is different from the controlling method 300 in steps S414 and S416.

As shown in FIG. 7 and FIG. 8, in response to the holding duration HLDb exceeds the first threshold period Pth1 and ends within the second threshold period Pth2 from the first time point TP1, step S414 is executed for generating a series of burst images BST captured by the camera module 110 during the holding duration HLDb and also a pre-capture period PRE in this case.

In other words, the burst images BST further includes at least one pre-captured image(s) during the pre-capture period PRE. In the embodiment, the pre-captured image is generated by dumping at least one of the temporary images captured during the pre-capture period PRE (between a third time point TP3 and the first time point TP1). In this embodiment, the third time point TP3 is set at one second earlier than the first time point TP1. However, the disclosure is not limited thereto. As shown in FIG. 8, the series of burst images BST are generated by dumping a series of the temporary images I6, I7, I8, I9, I5 I10, I11, I12, I13 . . . I17 corresponding to the pre-capture period PRE (between TP3 and TP1) and the holding duration HLDb (between TP1 and TPb).

As shown in FIG. 7 and FIG. 9, if the holding duration HLDc further exceeds the second threshold period Pth2, step S416 is executed for generating a series of burst images BST captured by the camera module 110 during the second threshold period Pth2 and the pre-capture period PRE in this case. As shown in FIG. 9, the series of burst images BST are generated by dumping a series of the temporary images I6, I7, I8, I9, I10, I11, I12, I13 . . . I25 corresponding to the pre-capture period PRE (between TP3 and TP1) and the second threshold period Pth2 (between TP1 and TP2).

Based on aforesaid embodiment, the controller module 120 control the camera module 110 to perform different functions and generates different output file (e.g., a singular image, burst images and/or a video) according to the different holding durations HLDa~HLDc of the switch button 130. The burst images can be generated by dumping the existed temporary images stored in the queue Q1 and may further include some pre-capture images right before the switch button 130 is pressed down.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A controlling method, suitable for an electronic apparatus comprising a camera module and a switch button, the controlling method comprising:
    sensing a signal from the switch button indicating whether the switch button is pressed down;
    measuring a holding duration of the switch button;
    determining the holding duration relative to a first threshold period and a second threshold period, the holding duration being started from a first time point when the switch button is pressed down;
    in response to the holding duration ending within the first threshold period from the first time point, triggering a singular shooting mode of the camera module for generating a singular image captured by the camera module at the first time point;
    in response to the holding duration exceeding the first threshold period and ends within the second threshold period from the first time point, triggering a burst shooting mode of the camera module for generating a series of burst images captured by the camera module during the holding duration; and
    in response to the holding duration exceeding the second threshold period, triggering the burst shooting mode of the camera module for generating a series of burst images captured by the camera module during the second threshold period, and triggering a video recording mode of the camera module for generating a video recorded by the camera module started from a second time point corresponding to the second threshold period, wherein the second time point is later than the first time point.

2. The controlling method of claim 1, wherein the electronic apparatus further comprising a sensor and a memory unit, the controlling method comprising:
in response to the sensor is triggered, activating the camera module to capture a series of temporary images periodically; and
storing the temporary images into a queue of the memory unit in chronological order.

3. The controlling method of claim 2, wherein the sensor is a grip sensor or a pressure sensor, and the sensor is triggered when the electronic apparatus is grasped.

4. The controlling method of claim 2, wherein in response to the holding duration ends within the first threshold period, the singular image is generated by dumping one of the temporary images corresponding to the first time point.

5. The controlling method of claim 2, wherein in response to the holding duration exceeds the first threshold period and ends within the second threshold period, the series of burst images are generated by dumping a series of the temporary images corresponding to the holding duration.

6. The controlling method of claim 5, wherein the series of burst images further comprises at least one pre-captured image, the pre-captured image is generated by dumping at least one of the temporary images captured between a third time point and the first time point, the third time point is earlier than the first time point.

7. The controlling method of claim 2, wherein in response to the holding duration exceeds the second threshold period, the series of burst images are generated by dumping a series of the temporary images corresponding to the second threshold period.

8. The controlling method of claim 7, wherein the series of burst images further comprises at least one pre-captured image, the pre-captured image is generated by dumping at least one of the temporary images captured between a third time point and the first time point, the third time point is earlier than the first time point.

9. The controlling method of claim 2, wherein in response to the holding duration exceeds the second threshold period, the camera module is switched into the video recording mode at the second time point for recording the video after the second time point.

10. An electronic apparatus, comprising:
a camera module;
a switch button, configured for generating a signal corresponding to whether the switch button is pressed down; and
a controller module, coupled with the camera module and the switch button, wherein the controller module is configured for sensing the signal from the switch button, measuring a holding duration of the switch button, determining the holding duration relative to a first threshold period and a second threshold period, and selectively triggering a singular shooting mode, a burst shooting mode and a video recording mode of the camera module according to the holding duration, wherein the holding duration is started from a first time point when the switch button is pressed down,
in response to the holding duration ends within the first threshold period from the first time point, the controller module is configured for triggering the singular shooting mode for generating a singular image captured by the camera module at the first time point;
in response to the holding duration exceeds the first threshold period and ends within the second threshold period from the first time point, the controller module is configured for triggering the burst shooting mode for generating a series of burst images captured by the camera module during the holding duration; and
in response to the holding duration exceeds the second threshold period, the controller module is configures for triggering the burst shooting mode for generating a series of burst images captured by the camera module during the second threshold period, and further configured for triggering the video recording mode for generating a video recorded by the camera module started from a second time point corresponding to the second threshold period, the second time point is later than the first time point.

11. The electronic apparatus of claim 10, wherein the electronic apparatus further comprises
a memory unit; and
a sensor, in response to the sensor is triggered, the controller module activates the camera module to capture a series of temporary images periodically, and the temporary images are stored into a queue of the memory unit in chronological order.

12. The electronic apparatus of claim 11, wherein the sensor is a grip sensor or a pressure sensor, and the sensor is triggered when the electronic apparatus is grasped.

13. The electronic apparatus of claim 11, wherein in response to the holding duration ends within the first threshold period, the controller module generates the singular image by dumping one of the temporary images corresponding to the first time point.

14. The electronic apparatus of claim 11, wherein in response to the holding duration exceeds the first threshold period and ends within the second threshold period, the controller module generates the series of burst images by dumping a series of the temporary images corresponding to the holding duration.

15. The electronic apparatus of claim 14, wherein the series of burst images further comprises at least one pre-captured image, the controller module generates the pre-captured image by dumping at least one of the temporary images captured between a third time point and the first time point, the third time point is earlier than the first time point.

16. The electronic apparatus of claim 11, wherein in response to the holding duration exceeds the second threshold period, the controller module generates the series of burst images by dumping a series of the temporary images corresponding to the second threshold period.

17. The electronic apparatus of claim 16, wherein the series of burst images further comprises at least one pre-captured image, the controller module generates the pre-captured image by dumping at least one of the temporary images captured between a third time point and the first time point, the third time point is earlier than the first time point.

18. The electronic apparatus of claim 11, wherein in response to the holding duration exceeds the second threshold period, the camera module is switched from a photo-capturing mode into a video-recording mode at the second time point for recording the video after the second time point.

* * * * *